United States Patent
Albrecht

(10) Patent No.: US 8,956,097 B2
(45) Date of Patent: Feb. 17, 2015

(54) STAPLE STRIP FOR FASTENING INSULATING PANELS TO WOODEN SUPPORTS

(71) Applicant: Joh. Friedrich Behrens AG, Ahrensburg (DE)

(72) Inventor: Klaus Albrecht, Bad Oldesloe (DE)

(73) Assignee: Joh. Friedrich Behrens AG (DE)

( * ) Notice: Subject to any disclaimer, the term of this patent is extended or adjusted under 35 U.S.C. 154(b) by 0 days.

(21) Appl. No.: 13/848,824

(22) Filed: Mar. 22, 2013

(65) Prior Publication Data
US 2013/0251477 A1 Sep. 26, 2013

(30) Foreign Application Priority Data
Mar. 23, 2012 (EP) ..................... 12002061

(51) Int. Cl.
F16B 15/08 (2006.01)
F16B 15/00 (2006.01)

(52) U.S. Cl.
CPC ............. *F16B 15/08* (2013.01); *F16B 15/0015* (2013.01)
USPC .......................................... 411/443; 411/442

(58) Field of Classification Search
CPC .................................. F16B 15/02; E04B 1/49
USPC ......... 411/442, 443, 457, 460, 461, 487, 489, 411/491, 493, 496
See application file for complete search history.

(56) References Cited

U.S. PATENT DOCUMENTS

| | | | | |
|---|---|---|---|---|
| 1,939,631 A * | 12/1933 | Randall | | 59/77 |
| 1,998,991 A * | 4/1935 | Heller | | 59/77 |
| 3,128,667 A * | 4/1964 | Tremblay | | 411/443 |
| 3,403,592 A | 10/1968 | Larson | | |
| 3,813,985 A * | 6/1974 | Perkins | | 411/442 |
| 4,114,859 A * | 9/1978 | Stenson | | 256/48 |
| 5,223,675 A * | 6/1993 | Taft | | 174/159 |
| 5,441,373 A * | 8/1995 | Kish et al. | | 411/442 |
| 5,772,379 A * | 6/1998 | Evensen | | 411/442 |
| 6,305,891 B1 * | 10/2001 | Burlingame | | 411/469 |
| 7,581,911 B2 * | 9/2009 | Tucker et al. | | 411/487 |
| 2009/0191023 A1 * | 7/2009 | Chang | | 411/443 |

FOREIGN PATENT DOCUMENTS

| | | |
|---|---|---|
| DE | 1956332 | 3/1967 |
| DE | 29903556 | 5/1999 |
| EP | 1097632 | 10/2000 |
| EP | 1331407 | 1/2003 |

* cited by examiner

*Primary Examiner* — Roberta Delisle
(74) *Attorney, Agent, or Firm* — Stuart H. Mayer; Mayer & Williams PC

(57) ABSTRACT

A staple strip having a plurality of staples connected together for fastening insulating panels to wooden supports, wherein
  each of the staples has a crown and two legs disposed parallel to each other, connected to the crown,
  the length of the legs is at least three time as long as the width of the crown,
  each leg has a cylindrical section and an end section, and
  each end section tapers with increasing distance from the cylindrical section, and converges tapered to a point disposed on a center longitudinal axis of the respective leg.

15 Claims, 4 Drawing Sheets ized multiple wire process. Instead, a so-called single wire process is generally used in which the cut ends are produced at the individual end sections before the individual wires are connected together.

STAPLE STRIP FOR FASTENING INSULATING PANELS TO WOODEN SUPPORTS

BACKGROUND OF THE INVENTION

The invention relates to a staple strip having a plurality of staples, connected together, for fastening insulating panels to wooden supports. The staples of such staple strips each have a crown and two legs disposed parallel to each other and connected to the crown. The legs each have a cylindrical section and an end section.

Staple strips are proven fastening means for working with stapler devices. For this purpose, staple strips are inserted into special receptacles of the stapler device. The stapler device then drives the staples individually into the workpiece, in that the device in each case releases the foremost staple of an inserted strip of staples and drives the staple into the workpiece. Depending on the application area, the staples have very different dimensions and variously shaped end sections. The conventional staple cut ends are described based on FIG. 4. In each case the upper part of the shows a staple in a top view. The lower part of the schematically shows the staple in the state driven into a workpiece.

FIG. 4a) shows the most widely used chisel cut end with which the end sections in each case have two opposite angled faces. The angled faces intersect at the front end of the end sections, so that a cutting edge runs approximately perpendicular to the plane of projection. As the lower part of the shows, the legs of this staple, in the driven-in state, ideally run in a straight line into the workpiece.

FIG. 4b) shows a staple with an inner cut end with which the end sections each have one angled face on the inner side; part c) of FIG. 4 shows a so-called outer cut end, with which each end section likewise has only one angled face, this time on the outer side. The inner cut end upon driving in the staple, leads to a spreading out of the legs, whereas the legs with an outer cut end, upon driving in, move toward each other. In both cases, the extraction forces of the staple are increased due to the curved progression of the legs in the workpiece.

Part d) of the shows an alternative, which likewise leads to spreading out of the legs, and is protected by the applicant in the patent EP 1 331 407 B1. Here, end sections are used having a customary chisel cut end, however, in combination with groove marks applied to the outside of the legs in the cylindrical sections of the staple.

All staples of the FIGS. 4a) to 4d) can be produced with the so-called multiple wire process. With this production method, wires for the staples are initially disposed in parallel with each other and connected together to a flat tape. From this tape, in each case, a section required for a staple strip is separated, and by bending twice, acquires the U shape of the manufactured staple strip. The end sections, possibly including additionally present groove marks according to FIG. 4d), can be implemented during the processing of the tape material, thus in one work step for all staples of a staple strip. In particular, the cut ends can be produced simultaneously with the separation of the tape material into the longitudinal sections necessary for each staple strip.

Staples having a so-called sawtooth cut end according to FIG. 4e) are also known. With this variant, each end section also has only one angled face, which however is disposed inclined with respect to the plane of the staple, as shown in the Figure. Both angled surfaces of a staple have opposing inclines such that the two legs of the staple spread out in opposing directions upon driving in. Staple strips having a saw-tooth cut end cannot be readily produced in the summarized multiple wire process. Instead, a so-called single wire process is generally used in which the cut ends are produced at the individual end sections before the individual wires are connected together.

With the fastening of insulating panels to wooden supports, particularly in the prefabricated building industry, particular difficulties arise due to the significant thickness of the insulating panels and the narrow width of the wooden supports. Although the very long staples necessary for fastening allow easy driving into the relatively soft insulating panels despite an insulating panel thickness of 10 cm or more for example, the legs of the staple frequently however do not have a straight progression through the insulating panel. Instead, the legs deviate so strongly from the intended straight progression that they miss the wooden support disposed at the backside of the panel. This results in inadequate fastening.

SUMMARY OF THE INVENTION

Based on this background, the object of the invention is to provide a staple strip having a plurality of staples, connected together, for fastening insulating panels to wooden supports, the staples of which can be driven in a line that is more straight into the insulating panels and thus allowing a reliable fastening even of very thick insulating panels to relatively narrow wooden supports.

This objective is solved by the staple strip with the characteristics of claim 1. Advantageous designs are given in the dependent claims. The staple strip has a plurality of staples connected together and serves for fastening insulating panels to wooden supports. Each of the staples has a crown and two legs disposed parallel to each other and connected to the crown. The length of the leg is at least three times as long as the width of the crown. Each leg has a cylindrical section and an end section. The cylindrical section has a uniform cross-section over the entire length that can be for example circular, or oval, flattened or polygonal. With the invention, each end section tapers with increasing distance from the cylindrical section, and converges tapered to a point disposed on the center longitudinal axis of the respective leg.

The invention is based on the recognition that using conventional staples having a chisel cut end with insulating panels does not lead to the desired result. In this regard it is assumed that on the one hand the specific properties of the insulating panels are a contributing factor because these are generally composed of inhomogeneous materials, for example randomly disposed wooden fibers. Additionally it was determined that chisel cut ends particularly with larger wire thicknesses can be difficult to manufacture with perfect symmetry. Instead, manufacturing the chisel cut ends using a stamp leads to a non-symmetrical punch breakaway which can lead to a lateral deflection of the leg during driving into the insulating panel.

Surprisingly, it was observed that the manufacture of suitable staples is easy when the legs are manufactured with end sections converging tapered to a point on the center longitudinal axis of the respective leg. It is presumed that the straight-line progression observed when driving in staples with such end sections can be attributed on the one hand to the fact that the nearly point like tip encounters fewer material inhomogeneities of the insulating panel. On the other hand, the fact that a sufficiently symmetrical end section can be at easily attained with the manufacturing of such tips also contributes to the success.

The staple strips according to the invention can be manufactured in particular with the initially described single wire process. The end sections can be formed during separation of the wire into the respective longitudinal sections necessary for a staple. Then, the longitudinal sections can be brought into the final shape of the staple by bending twice at 90° angles, and connected together, particularly using a suitable adhesive means.

The fact that the end sections converge tapered to a point disposed on the center longitudinal axis of the respective leg does not necessarily mean that a perfectly pointed tip must be present. Also more or less strongly rounded tips, or tips that are not perfectly pointed and are deformed as a consequence of manufacturing tolerances, are considered as converging tapered to a point.

There are other possibilities for shaping the tapering end sections. The end sections can be formed conically for example. Likewise it is also possible to use so-called ballistic tips. These are shaped comparable to the tips of projectiles, thus having cross-sectional dimensions decreasing from the cylindrical section towards the tip with increasing slope.

In one design, the end sections of a staple are mirror symmetrical to a first plane of symmetry enclosing the center longitudinal axis of both legs of this staple. Thereby, a deviation of the end sections perpendicular to the first plane of symmetry is prevented.

In one design the end section of a leg is mirror symmetrical to a second plane of symmetry, which encloses the center longitudinal axis of this leg and is disposed perpendicular to the crown connected to this leg. This measure prevents a deviation of the end sections, particularly perpendicular to the second plane of symmetry. Deviations in this direction are particularly difficult to control, because in this direction the staples have relatively large manufacturing tolerances depending on the two bendings of the wire, that a guiding mechanism formed at a stapler device must take into account. In addition, a few simple stapler devices cannot guide the legs during driving at the inner sides of the two legs facing each other, because guide elements disposed in these regions during driving of the staple must be removed from the path of the staple crown in order to avoid collision, which requires a relatively elaborate construction of the guidance. Therefore it is advantageous to counteract the deviation of a leg toward the respectively other leg of the staple using the named mirror symmetrical design of the end section.

In one design, the cross-section of the end section has two first edges which are disposed in the first plane of symmetry. The two first edges can emanate from the point forming the tip of the end sections. From there they can extend, for example in a straight line, up to the cylindrical section. The first edges have an effect similar to cutting edges and cause a guidance of the end sections in the direction of the center longitudinal axis. Thereby, they prevent undesired deviation of the legs out of the first plane of symmetry.

In one design, the cross-section of the end section has two second edges that are disposed in a second plane of symmetry. The two second edges can emanate particularly from the point forming the tip of the end sections. From there they can extend, for example in a straight line, up to the cylindrical section. The second edges like the first edges have an effect similar to cutting edges and cause guidance of the end sections in the direction of the center longitudinal axis. Due to the arrangement of the second edges in the second plane of symmetry, they prevent in particular an undesired deviation of the leg out of the second plane of symmetry.

In one design, the two first edges and/or the two second edges are disposed at an angle in the range of 20° to 60° to the center longitudinal axis. Tests have shown an advantageous guidance effect is attained in this angular range.

In one design, the two second edges are longer than the two first edges. The different lengths can be formed by longer half-axes of the cross-section in the second planes of symmetry than in the first plane of symmetry. Likewise it is possible to form the second edges at a smaller angle to the center longitudinal axis than the first edges. This design particularly improves the guidance in the second plane of symmetry, which is particularly important in practice for the stated reasons.

In one design, the end sections have a square or diamond shaped cross-section. In the case of a square cross-section, the end sections can be tetrahedral, thus having the shape of a pyramid with a square base surface. Such tips are also referred to as diamond tips. With a diamond-shaped section, there are no right angles formed at the corners of the cross-section, rather the "pyramid" has a diamond-shaped base surface with four sides of equal length. Such end sections having diamond-shaped cross-sections are suitable, particularly in combination with wires having oval or flattened cross-sections.

In one design, the end section of a leg has at least one angled face which is inclined at an angle in the range of 20° to 60° with respect to the center longitudinal axis of the leg. End sections having such angled faces can be easily produced particularly with specific punch tools, and contribute to a straight line penetration of the leg.

In one design, the end sections are oval or circular in the cross-section thereof. In this case, the end sections overall are particularly conical or flattened-conical. Both cases favor a straight line penetration of the leg.

In one design, the cylindrical sections and/or the crown have an oval or a circular cross-section. Particularly for producing staples, wires having an appropriate cross-section can be used.

In one design, the cylindrical sections and/or the crown are produced from wires having a circular cross-section that are provided with two opposing flattenings, using rolling. Due to this rolling of the wire, the legs, particularly the cylindrical sections, can be fixed by forming suitable material stresses in a straight stretched shape. These measures also contribute to a straight penetration of the leg in the material.

In one design, the cylindrical sections and/or the crown of the staples have a diameter in the range of 2 mm to 4 mm. Preferably the named diameter can lie in the range of 2.5 mm to 3.5 mm. Such material thicknesses allow the production even of very long staples which have sufficient stiffness with the leg lengths in the range, for example, of 100 mm to 220 mm, preferably in the range of 160 mm to 200 mm. The width of the crown of such staples can lie in the range, for example, of 15 mm to 35 mm, preferably in the range of 20 mm to 30 mm.

In one design the staples are connected together using an adhesive means. The adhesive means can be a lacquer or glue for example. Likewise it is possible, alternatively or also additionally, to use adhesive strips, for example of paper or of an elastic material.

The invention is explained in greater detail below based on embodiments shown in figures. In the figures:

DETAILED DESCRIPTION OF THE INVENTION

Figure 1:
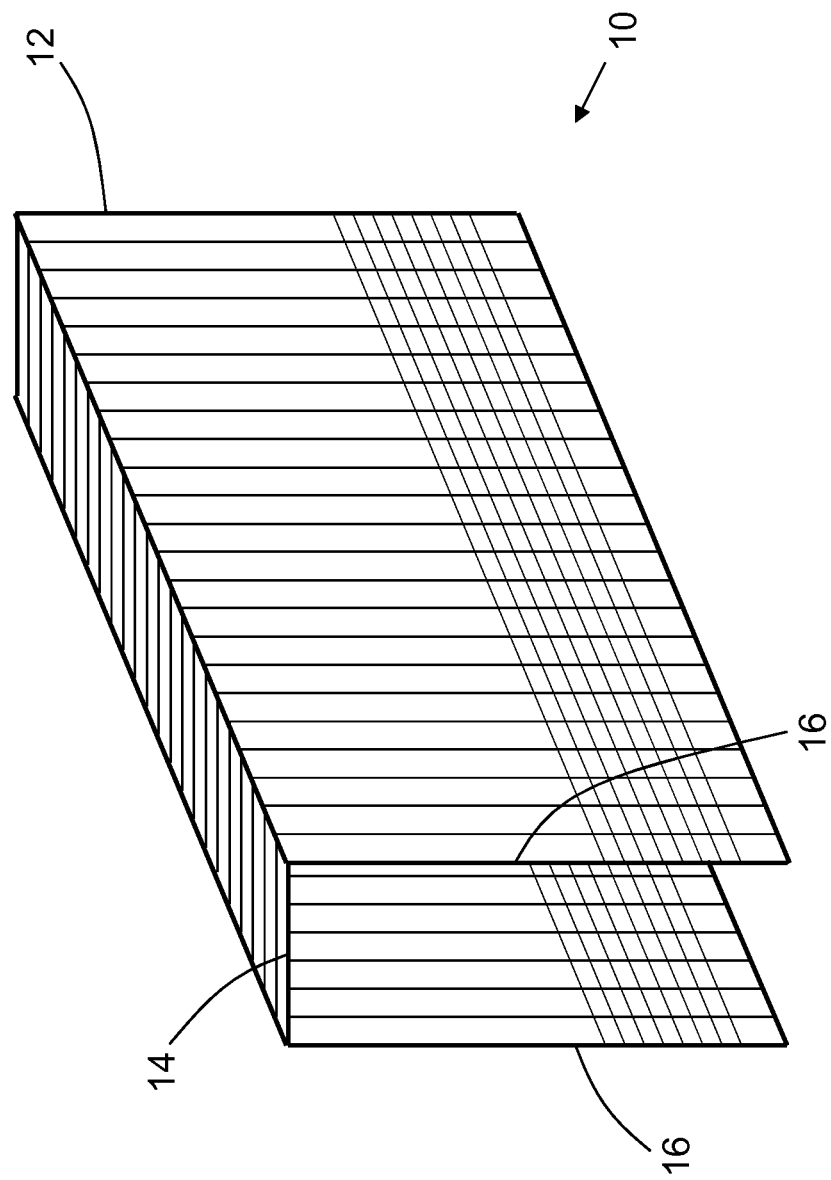
FIG. 1 shows a staple strip according to the invention in a simplified schematic representation, FIG. 2a)-e) show a staple of a staple strip according to the invention in various views, FIG. 3a)-e) show a staple of another staple strip according to the invention in various views, FIG. 4a)-e) show five different staples according to the prior art.

The staple strip 10 from FIG. 1 has a plurality of staples 12, connected together. The staples 12 are connected together using an adhesive means. Each staple 12 forms a U with a crown 14 and two legs 16. The staples 12 aligned in a row next to each other form the staple strip 10 that in profile also has a U-shape. In this manner, respectively 10 to 200 staples 12 can be combined into a staple strip 10, for example. The details of the individual staples 12 are easier to see in the FIGS. 2 and 3.

Figure 2:
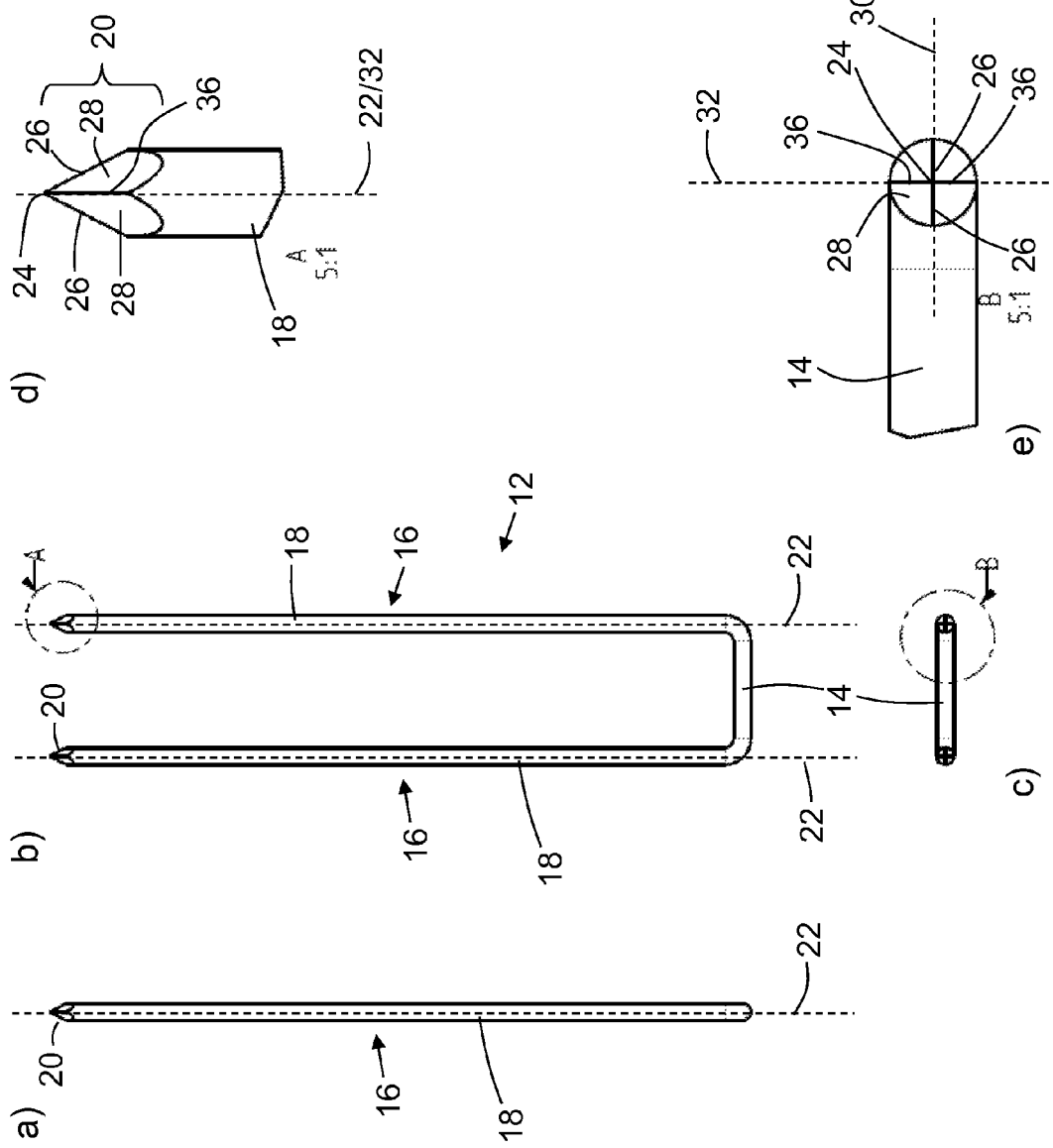

FIG. 2 shows a staple 12 of a staple strip 10 according to the invention which is composed of a steel wire having a circular cross-section. FIG. 2a) shows a top view of the side of one of the legs 16. In the top view of FIG. 2b), the view is aligned towards the plane of the staple 12 so that both legs 16 and the crown 14 of the staple 12 are visible. In FIG. 2c) the view is aligned from the side facing away from the crown 14 towards the free end of the two legs 16. FIG. 2d) shows an enlargement of the section of FIG. 2b), labeled A. FIG. 2e) shows an enlargement of the section of FIG. 2c), labeled B.

In the FIGS. 2a) and 2b) it can be seen that the legs 16 each have a cylindrical section 18 that is connected at one end to the crown 14 of the staple 12. The transition between the crown 14 and the cylindrical section 18 has a relatively small radius of curvature which results from bending the wire. The cylindrical sections 18 extend over nearly the entire length of the legs 16. Toward the free end of the legs 16, the cylindrical sections 18 respectively end in an end section 20. Each leg 16 has a center longitudinal axis 22 shown with a dotted line. The center longitudinal axis 22 extends in a straight line through the center of the cylindrical section 18.

As best seen in the FIG. 2d), the end sections 20 taper with increasing distance from the cylindrical section 18 and converge tapered to a point 24 disposed on the center longitudinal axis 22. At the point 24, a tip is formed which can be more or less strongly rounded.

As further seen in FIG. 2d) in connection with FIG. 2e), the end section 20 is mirror symmetrical to a second plane of symmetry 32. The second plane of symmetry 32 runs perpendicular to the plane of projection, that is quasi-perpendicular to the crown 14 of the associated staple 12 and encloses the center longitudinal axis 22.

The end section 20 additionally has two first edges 26 and two second edges 36 between which angled faces 28 are respectively formed. The angled faces are inclined at an angle of approximately 30° with respect to the center longitudinal axis 22. The two first edges 26 lie in the first plane of symmetry 30, corresponding to the plane of projection of FIG. 2d). The two second edges 36, one of which is facing the viewer, the other of which is located on the backside and therefore is not visible, lie in the second plane of symmetry 32. The two first edges 26 lie across from each other with respect to the center longitudinal axis 22. This applies also to both second edges 36. The first edges 26 and the second edges 36 respectively start at the point 24 and extend from there in a straight line up to the cylindrical section 18. As seen in the FIG. 2a), the end sections 20 are also formed mirror symmetrical relative to a first plane of symmetry 30 which encloses the center longitudinal axis 22 of both legs 16. The first plane of symmetry 30 is perpendicular to the plane of projection of the FIG. 2a).

The two legs 16 are aligned parallel to each other, respectively also the two associated center longitudinal axes 22. A right angle is formed between the crown 14 and the adjacent legs 16.

The first plane of symmetry 30 and the second plane of symmetry 32 are shown in the FIG. 2e). Both planes are in turn perpendicular to the plane of projection. It can also be seen that the four angled faces 28 are respectively disposed in pairs lying opposite each other, and the first edges 26 and the second edges 36 which are running in between. The point 24 denoting the tip of the end section 20 lies in both the first plane of symmetry 30 as well as in the second plane of symmetry 32, and additionally on the center longitudinal axis 22.

Figure 3:
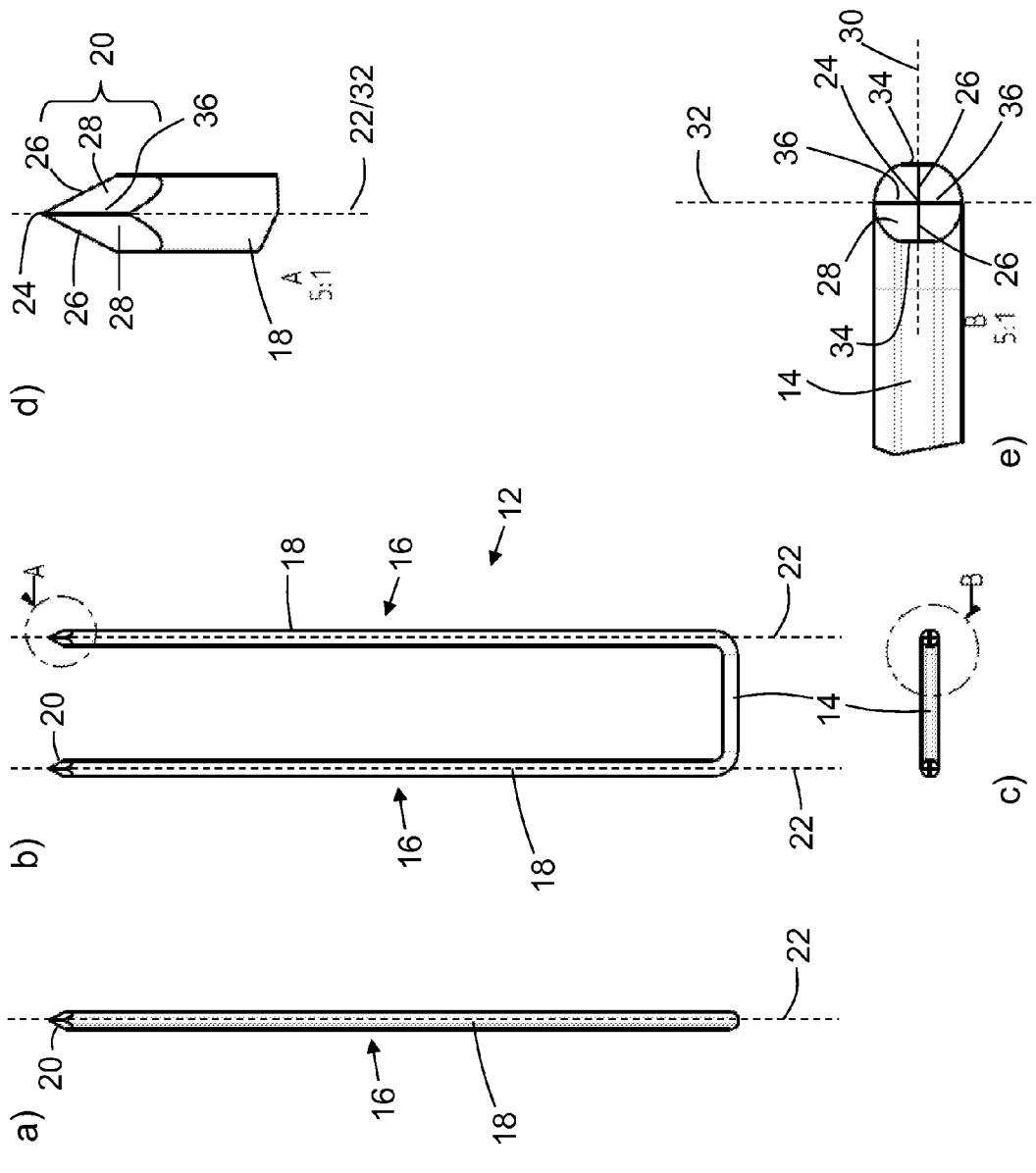

In FIG. 3 the same reference numbers are used for the same parts corresponding to the example embodiment of FIG. 2. The staple 12 shown in FIG. 3 differs from the staple of FIG. 2, in that the circular wire used for production is provided, due to rolling, with two flattenings 34 lying across from each other. This is seen most clearly in FIG. 3e). The flattenings 34 extend over the entire length of the wire used for producing a staple, that is, the flattenings are formed both on the crown 14 as well as the legs 16, or respectively in each case at the cylindrical sections 18 thereof. As clearly seen particularly in FIG. 3e), the flattenings 34 at the cylindrical sections 18 of the legs 16 are formed parallel to the second plane of symmetry 32. The adjoining cross-sectional sections of the cylindrical sections 18 are nearly semi-circular, however, are slightly deformed with respect to ideal semicircles due to the flattenings 34 formed by rolling.

The end sections 20 of the staple 12 from FIG. 3 differ from those of the staple of FIG. 2 due to the different cross-section of the processed wire. This can be seen most clearly in the enlarged representation of FIG. 3d). The end section 20 also has four angled faces 28 disposed inclined with respect to the center longitudinal axis 22. These are respectively limited by two different edges 26, 36. The first edges 26, which are disposed in the first plane of symmetry 30, are shorter than the second edges 36 disposed in the second plane of symmetry 32. Because the first and second edges 26, 36 respectively enclose the same angle to the longitudinal axis 22, the different lengths of the first and second edges 26, 36 is due to the greater dimensions of the processed wire in the second plane of symmetry 32 in comparison to the dimensions in the first plane of symmetry 30. However, the greater length of the second edges 36 can particularly effectively prevent deviation of the legs 16 toward the center of the staple 12 during driving into a material.

Figure 4:
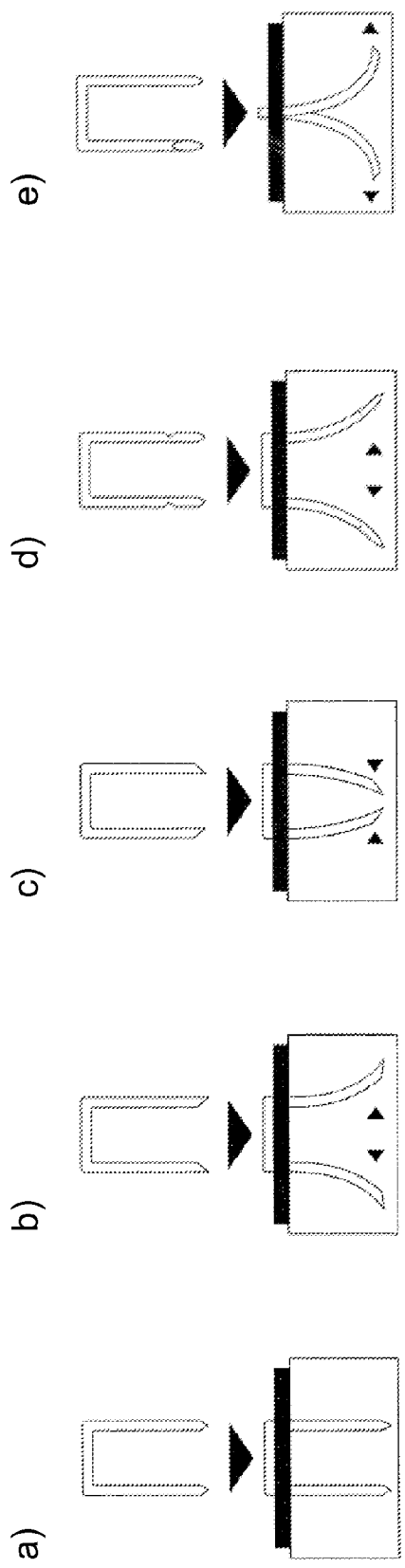

The prior art of FIG. 4 was already explained in the introduction to the description.

The invention claimed is:

1. A staple strip, comprising:
a plurality of staples connected to each other for fastening insulating panels to wooden supports, each of the staples having a crown and two legs connected to the crown, the two legs being disposed parallel to each other, wherein the legs have a length that is at least three time as long as a width of the crown, each leg having a cylindrical section and an end section, wherein each end section tapers with increasing distance from the cylindrical section, and tapers to a point disposed on a center longitudinal axis of the respective leg, wherein the end section of a leg has at least one angled face which is inclined at an angle within a range of 20° to 60° with respect to the center longitudinal axis of the leg.

2. The staple strip according to claim 1, wherein the end sections of a staple are mirror symmetrical to a first plane of symmetry enclosing the center longitudinal axis of both legs of the staple.

3. The staple strip according to claim 2, wherein the end section has two first edges which are disposed in the first plane of symmetry.

4. The staple strip according to claim 3, wherein the two first edges and/or the two second edges are disposed at an angle within a range of 20° to 60° with respect to the center longitudinal axis.

5. The staple strip according to claim 1, wherein the end section of a given leg is mirror symmetrical to a second plane of symmetry which encloses the center longitudinal axis of the given leg, and is disposed perpendicular to the crown connected to the given leg.

6. The staple strip according to claim 5, wherein the end section has two second edges which are disposed in the second plane of symmetry.

7. The staple strip according to claim 6, wherein the two second edges are longer than the two first edges.

8. The staple strip according to claim 1, wherein the end sections have a square or diamond shaped cross-section.

9. The staple strip according to claim 1, wherein the end sections have an oval or circular cross-section.

10. The staple strip according to claim 1, wherein the cylindrical sections and/or the crown have an oval or circular cross-section.

11. The staple strip according to claim 1, wherein the cylindrical sections and/or the crown are produced from a wire having a circular cross-section that is provided with two flattenings lying across from each other, using rolling.

12. The staple strip according to claim 1, wherein the cylindrical sections and/or the crown of the staple have a diameter in the range of 2 mm to 4 mm.

13. The staple strip according to claim 1, wherein the staples are connected together using an adhesive.

14. A staple strip, comprising:
a plurality of staples connected to each other for fastening insulating panels to wooden supports, each of the staples having a crown and two legs connected to the crown, the two legs being disposed parallel to each other, wherein the legs have a length that is at least three time as long as a width of the crown, each leg having a cylindrical section and an end section, wherein each end section tapers with increasing distance from the cylindrical section, and tapers to a point disposed on a center longitudinal axis of the respective leg, wherein the end sections of a staple are mirror symmetrical to a first plane of symmetry enclosing the center longitudinal axis of both legs of the staple, the end sections having has two first edges which are disposed in the first plane of symmetry, and the two first edges and/or the two second edges are disposed at an angle within a range of 20° to 60° with respect to the center longitudinal axis.

15. A staple strip, comprising:
a plurality of staples connected to each other for fastening insulating panels to wooden supports, each of the staples having a crown and two legs connected to the crown, the two legs being disposed parallel to each other, wherein the legs have a length that is at least three time as long as a width of the crown, each leg having a cylindrical section and an end section, wherein each end section tapers with increasing distance from the cylindrical section, and tapers to a point disposed on a center longitudinal axis of the respective leg, wherein the end section of a given leg is mirror symmetrical to a second plane of symmetry which encloses the center longitudinal axis of the given leg, and is disposed perpendicular to the crown connected to the given leg, the end section having two edges which are disposed in the second plane of symmetry, the two edges being disposed at an angle within a range of 20° to 60° with respect to the center longitudinal axis.

* * * * *

UNITED STATES PATENT AND TRADEMARK OFFICE
CERTIFICATE OF CORRECTION

| | |
|---|---|
| PATENT NO. | : 8,956,097 B2 |
| APPLICATION NO. | : 13/848824 |
| DATED | : February 17, 2015 |
| INVENTOR(S) | : Klaus Albrecht |

Page 1 of 1

It is certified that error appears in the above-identified patent and that said Letters Patent is hereby corrected as shown below:

In the Specification

At column 1, line 29, following "As the lower part of the", insert --figure--.

At column 1, line 41, following "Part d) of the", insert --figure--.

Signed and Sealed this
Twenty-sixth Day of May, 2015

Michelle K. Lee
*Director of the United States Patent and Trademark Office*